United States Patent
Hirano et al.

(10) Patent No.: US 9,335,465 B2
(45) Date of Patent: May 10, 2016

(54) OPTICAL FIBER AND OPTICAL FIBER PREFORM

(71) Applicant: SUMITOMO ELECTRIC INDUSTRIES, LTD., Osaka-shi, Osaka (JP)

(72) Inventors: Masaaki Hirano, Yokohama (JP); Tetsuya Haruna, Yokohama (JP); Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 363 days.

(21) Appl. No.: 13/741,553

(22) Filed: Jan. 15, 2013

(65) Prior Publication Data

US 2013/0188917 A1    Jul. 25, 2013

(30) Foreign Application Priority Data

Jan. 23, 2012    (JP) ................................ 2012-011107

(51) Int. Cl.
*G02B 6/02*    (2006.01)
*G02B 6/036*    (2006.01)

(52) U.S. Cl.
CPC .............. *G02B 6/02042* (2013.01); *G02B 6/02* (2013.01); *G02B 6/03605* (2013.01); *G02B 6/03611* (2013.01); *G02B 6/03644* (2013.01); *G02B 6/03694* (2013.01)

(58) Field of Classification Search
None
See application file for complete search history.

(56) References Cited

U.S. PATENT DOCUMENTS

| 3,971,645 | A | | 7/1976 | Bachmann et al. |
| 5,146,534 | A | | 9/1992 | Lines |
| 5,509,101 | A | * | 4/1996 | Gilliland et al. ............... 385/142 |
| 6,153,546 | A | | 11/2000 | Saitoh et al. |
| 7,088,900 | B1 | | 8/2006 | Mishra |
| 7,489,850 | B1 | | 2/2009 | Berkey |
| 7,536,076 | B2 | | 5/2009 | Khrapko et al. |
| 7,844,155 | B2 | | 11/2010 | Bickham et al. |

(Continued)

FOREIGN PATENT DOCUMENTS

| EP | 2 511 741 A2 | 10/2012 |
| JP | 2005537210 A | 12/2005 |

(Continued)

OTHER PUBLICATIONS

U.S. Office Action dated Sep. 16, 2015 that issued in U.S. Appl. No. 14/743,270 including Double Patenting Rejections on p. 5.

*Primary Examiner* — Hemang Sanghavi

(74) *Attorney, Agent, or Firm* — Drinker Biddle & Reath LLP

(57) ABSTRACT

An optical fiber containing an alkali metal element and exhibiting low attenuation as well as excellent radiation resistance is provided. The optical fiber of the present invention has a core region and a cladding region enclosing the core region. The core region contains alkali metal elements by an average concentration of 0.2 atomic ppm or more. The attenuation at a wavelength of 1550 nm after irradiating with the radiation of 0.10 Gy or more of cumulative absorbed dose increases by 0.02 dB/km or less as compared with the attenuation exhibited prior to radiation exposure.

10 Claims, 6 Drawing Sheets

(56) References Cited

U.S. PATENT DOCUMENTS

| | | |
|---|---|---|
| 7,929,818 B1 | 4/2011 | Bickham et al. |
| 8,666,214 B2 | 3/2014 | Bookbinder et al. |
| 9,097,834 B2 | 8/2015 | Hirano et al. |
| 2005/0063663 A1* | 3/2005 | Anderson et al. ............... 385/142 |
| 2005/0129376 A1 | 6/2005 | Hanson et al. |
| 2006/0130530 A1 | 6/2006 | Anderson et al. |
| 2007/0116418 A1 | 5/2007 | Mishra |
| 2007/0297735 A1* | 12/2007 | Khrapko et al. ............... 385/127 |
| 2008/0273849 A1* | 11/2008 | Sanders et al. ................ 385/126 |
| 2008/0279515 A1 | 11/2008 | Bickham et al. |
| 2012/0134376 A1* | 5/2012 | Burov et al. ....................... 372/6 |
| 2013/0034654 A1 | 2/2013 | Haruna et al. |
| 2013/0188917 A1 | 7/2013 | Hirano et al. |

FOREIGN PATENT DOCUMENTS

| | | |
|---|---|---|
| JP | 2007504080 A | 3/2007 |
| JP | 2008536190 A | 9/2008 |
| JP | 2009541796 A | 11/2009 |
| JP | 2010501894 A | 1/2010 |
| JP | 2010526749 A | 8/2010 |
| WO | WO-9802389 A1 | 1/1998 |
| WO | WO-2004020357 A2 | 3/2004 |
| WO | WO-2005021455 A2 | 3/2005 |
| WO | WO 2005/058765 | 6/2005 |
| WO | WO 2006/112918 | 10/2006 |
| WO | WO-2007149344 A1 | 12/2007 |
| WO | WO-2008024255 A2 | 2/2008 |
| WO | WO-2008136929 A1 | 11/2008 |

* cited by examiner

OPTICAL FIBER AND OPTICAL FIBER PREFORM

BACKGROUND OF THE INVENTION

1. Field of the Invention

The present invention relates to an optical fiber and an optical fiber preform.

2. Description of the Background Art

A silica glass optical fiber which contains an alkali metal element in the core region is described in JP2005-537210A, US2006/0130530A, JP2007-504080A, JP2008-536190A, JP2010-501894A, JP2009-541796A, JP2010-526749A, WO98/002389, and U.S. Pat. No. 5,146,534. It is said that if the core portion of an optical fiber preform contains an alkali metal element, the viscosity of the core portion can be decreased and the relaxation of the network structure of silica glass is enhanced when the optical fiber preform is drawn into a fiber, and consequently the attenuation of a resultant optical fiber can be reduced.

JP2005-537210A and US 2006/0130530A describe a diffusion method as a method of adding an alkali metal element to silica glass. The diffusion method is a method for carrying out diffusion doping of an alkali metal element into the inner surface of a glass pipe by heating the glass pipe by means of an outside heat source, or by generating plasma inside the glass pipe, while introducing materials vapor containing the alkali metal element or an alkali metal salt into the glass pipe.

After the glass pipe is doped with an alkali metal element in the vicinity of inner surface thereof in the above-mentioned manner, the glass pipe is heated to reduce its diameter. After such diameter reduction, the inner surface of the glass pipe is etched by a given thickness to remove contamination including water and transition metal elements such as Ni and Fe which have inevitably been added simultaneously when the alkali metal element are added. Since the diffusion of the alkali metal element is faster than that of the transition metal elements, it is possible to cause the alkali metal element to remain even if the transition metal elements are removed by etching a given thickness of the glass surface. After such etching, the glass pipe is collapsed by heating, and thereby a core rod containing the alkali metal element is prepared. A cladding is formed on the outside of the core rod containing alkali metals, whereby an optical fiber preform is produced. An optical fiber can be manufactured by drawing the optical fiber preform into a fiber.

SUMMARY OF THE INVENTION

The object of the present invention is to provide an optical fiber whose core region contains an alkali metal element and which has low attenuation and excellent radiation resistance properties, and to provide an optical fiber preform which is suitable for producing such optical fiber by drawing.

To achieve the object, an optical fiber of the invention has a core region and a cladding region enclosing the core region such that the core region contains an alkali metal at an average concentration of 0.2 atomic ppm or more. After radiation exposure with a cumulative absorbed dose of 0.10 Gy, the optical fiber exhibits an attenuation increase of 0.02 dB/km or less at a wavelength of 1550 nm as compared with the attenuation prior to the radiation exposure. The "atomic ppm" as used herein is a number of dopant atoms in $SiO_2$ of one million units, and the "absorbed dose" as used herein is a value for liquid water, which is 1.1 times a value for silica glass.

In an optical fiber of the present invention, the average concentration of the alkali metal at the core region may be 25 atomic ppm or less. The alkali metal in the core region may be potassium. The attenuation at a wavelength of 1550 nm may be 0.180 dB/km or less. The core region may have a minimum refractive index $N1$ at a radial coordinate $r1$ which is smaller than a radial coordinate $r2$ having a maximum refractive index $N2$ in the core region, and a refractive index $N3$ at the central axis of the core region may satisfy $N1<N3<N2$. Here, a position in the optical fiber is expressed by the cylindrical coordinate.

The core region of the optical fiber of the present invention may further contain chlorine by a minimum concentration of 300 atomic ppm or more. In this case, the average concentration of the chlorine may be 13,000 atomic ppm or less and 2,000 atomic ppm or more. In the core region, the minimum concentration of the chlorine may be 2,000 atomic ppm or more, and the average concentration of the chlorine may be 4,000 atomic ppm or more and 13,000 atomic ppm or less; the average concentration of the alkali metal may be 0.2 atomic ppm or more and 10 atomic ppm or less; the concentration of dopants other than the alkali metal and halogens may be smaller than the average concentration of the halogens; and the attenuation at a wavelength of 1550 nm may be 0.180 dB/km or less.

Another embodiment of the present invention is an optical fiber preform which has a core portion to become the core region of an optical fiber and a cladding portion to become the cladding region of the optical fiber, wherein the core portion has a first core portion including a central axis, a second core portion circumscribing the first core portion, and a third core portion circumscribing the second core portion, and wherein in the first core portion, the minimum concentration of alkali metal is 10 atomic ppm or more and the maximum concentration of chlorine is 10 to 600 atomic ppm; in the second core portion, the maximum concentration of alkali metal is 10 atomic ppm or less, and the maximum concentration of chlorine is 10 to 600 atomic ppm; and in the third core portion, the maximum concentration of alkali metal is 10 atomic ppm or less, and the average concentration of chlorine is 2,000 atomic ppm or more.

In the optical fiber preform of the present invention, the average concentration of the alkali metal in the core portion may be 1,000 atomic ppm or less, and the maximum concentration of fluorine in the third core portion may be 200 atomic ppm or less. The core portion may have the minimum refractive index $N1$ at the radial coordinate $r1$ which is smaller than the radial coordinate $r2$ having a maximum refractive index $N2$ in the core region, and the refractive index $N3$ at the central axis of the core portion may satisfy $N1<N3<N2$.

ADVANTAGEOUS EFFECT OF THE INVENTION

The optical fiber of the present invention has an alkali metal element in the core region and exhibits low attenuation and excellent radiation resistance properties.

DETAILED DESCRIPTION OF THE INVENTION

Figure 1:
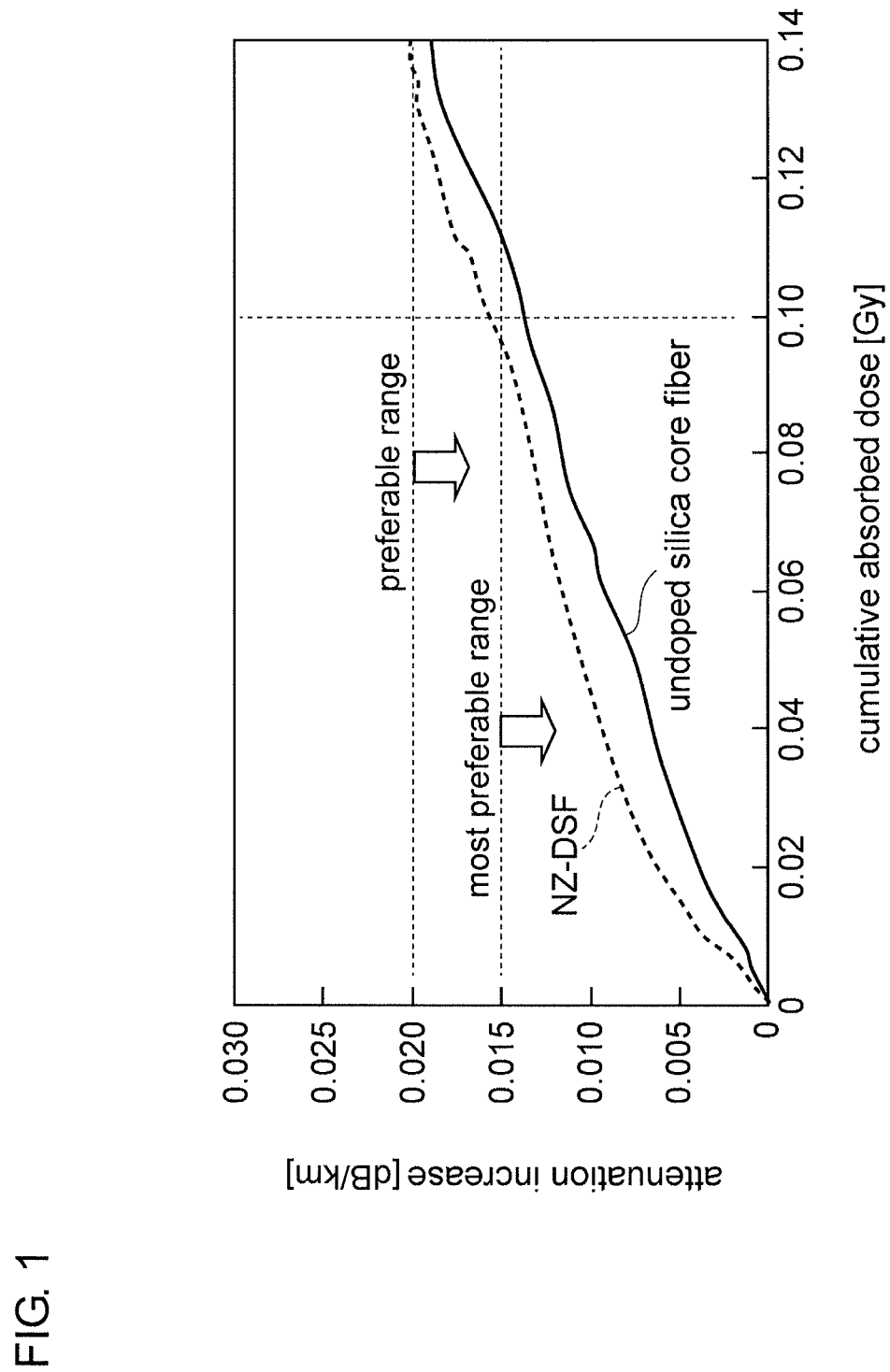
FIG. 1 is a graph showing relationship between the cumulative absorbed dose of gamma rays and the attenuation increase at a wavelength of 1550 nm.

Hereinafter, preferred embodiments of the present invention will be described in detail in reference to the accompanying drawings. In the drawings, an identical mark represents the same element so that the repetition of explanation may be omitted.

An alkali metal element in silica glass will move in the glass if high energy radiation such as gamma rays is irradiated, and consequently a defect will be generated in the glass network. Therefore, when an optical fiber composed of silica-based glass contains an alkali metal element in the core, there have been cases where the attenuation in a wavelength band for optical communications has increased due to gamma irradiation.

For example, JP2007-504080A describes an optical fiber in which peak concentration of alkali metal oxide in the core is 20 to 1,000 weight ppm. Also, JP2009-541796A describes an optical fiber in which average concentration of alkali metal oxide in the core is 50 to 500 ppm. In the case of a submarine cable manufactured using such an optical fiber which contains an alkali metal element in the core, there has been a fear that the attenuation in a communication band may increase as compared with an attenuation at the time of its installation.

An optical fiber according to an embodiment of the present invention is a silica-based optical fiber which contains an alkali metal in the core region and which has an attenuation of 0.020 dB/km or less, preferably 0.015 dB/km or less, at a wavelength of 1550 nm when irradiated with a cumulative absorbed dose of 0.10 Gy. If such optical fiber is adopted for manufacturing a submarine cable, the increase in attenuation of the submarine cable can be restrained in its use.

It is generally said that a submarine cable is subjected to a cumulative absorbed dose of about 0.01 Gy. The radiation dose to which an optical fiber of the submarine cable is actually exposed becomes still smaller, since optical fibers are protected by a sheath made of metal such as copper. In the case of absorbed dose of 0.01 Gy, the attenuation increase is so small that it will be buried within a tolerance of measurement. However, if the cumulative absorbed dose is about 0.10 Gy, the attenuation increase will comparatively be large, enabling correct measurement of radiation resistance properties of an optical fiber. It is desirable to use an optical fiber which exhibits attenuation increase of 0.02 dB/km or less (preferably, 0.015 dB/km or less) at a wavelength of 1550 nm when the optical fiber is exposed to a radiation of 0.1 Gy.

In particular, the average concentration of the alkali metal in the core region of the optical fiber is preferably 25 atomic ppm or less, and more preferably 10 atomic ppm or less. In the case of an optical fiber having such core region, it is possible to restrain attenuation increase when radiation is irradiated. Also, the minimum concentration of chlorine in the core of an optical fiber is preferably 300 atomic ppm or more. This enables reducing the attenuation. In particular, the minimum concentration of the chlorine in the core of an optical fiber is more preferably 1,000 atomic ppm or more.

The following is an explanation on the results of investigation about the relationship between alkali metal concentration in the core region of an optical fiber and the attenuation increase due to radiation exposure. FIG. 1 is a graph showing relationship between cumulative absorbed dose of gamma rays and attenuation increase at a wavelength of 1550 nm. A solid line shows such relationship in the case of an optical fiber having a core including potassium of 5 atomic ppm as the alkali metal element in average of the core region, and a dashed line shows such relationship in the case of a non-zero dispersion shifted optical fiber (NZ-DSF) which has a core containing $GeO_2$ of about 7 mol % and is usually adopted for a submarine cable. Here, the concentration of alkali metal element in an optical fiber was measured by SIMS. The optical fibers were irradiated at an absorbed dose rate of 0.04 Gy/h with gamma rays generated from cobalt 60, and the product of absorbed dose rate and irradiation time was adopted as cumulative absorbed dose. As for the attenuation increase, the increase from a value available before such gamma irradiation was measured by the well-known OTDR method at a wavelength of 1550 nm during the gamma irradiation.

As can be seen from FIG. 1, the greater the cumulative absorbed dose, the larger the attenuation increase becomes. If the attenuation increase of a fiber is within a range of 0.020 dB/km or less when the cumulative absorbed dose is 0.10 Gy, such fiber can be used for a submarine cable. It is still more desirable if the attenuation increase is 0.015 dB/km or less, which is equivalent to attenuation increase exhibited by a NZ-DSF that has already been adopted for submarine cable use.

Figure 2:
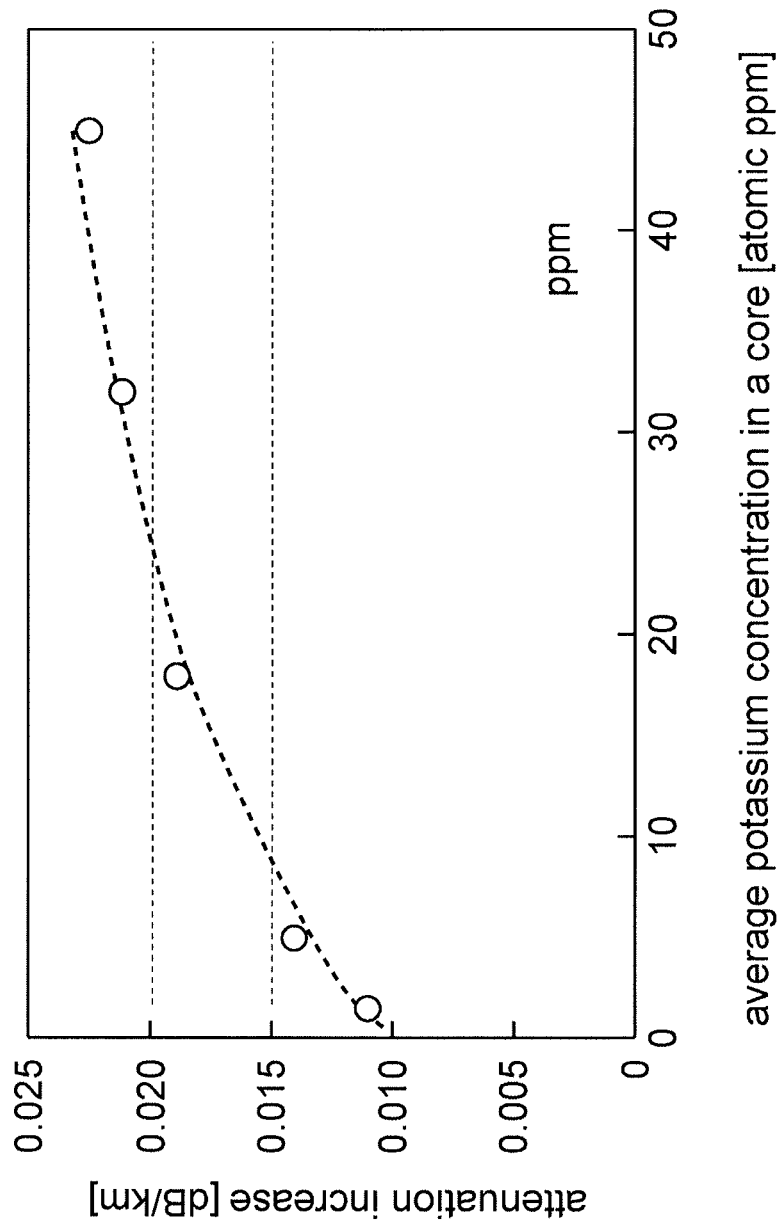
FIG. 2 is a graph showing relationship between attenuation increase at a wavelength of 1550 nm and average potassium concentration in a core region.

FIG. 2 is a graph showing relationship between attenuation increase at a wavelength of 1550 nm and average potassium concentration in a core region. The attenuation increase at a wavelength of 1550 nm was measured after irradiating optical fibers with a gamma ray of 0.04 Gy/h until the cumulative absorbed dose of gamma rays becomes 0.10 Gy. The average concentration of potassium atoms in a core region was set to be 2, 5, 18, 32, and 45 atomic ppm. The values of concentration of $K_2O$ by weight converted from those values of average concentration of potassium atoms were 4 weight ppm, 14 weight ppm, 25 weight ppm, and 35 weight ppm, respectively.

As shown in FIG. 2, it can be seen that the higher the concentration of potassium (i.e., alkali metal), the more the attenuation increases due to radiation exposure. Preferably, the average concentration of alkali metal in a core is 25 atomic ppm or less (20 weight ppm or less when converted into a concentration of $K_2O$ by weight); in such case, the attenuation increase at a wavelength of 1550 nm becomes 0.020 dB/km or less when the cumulative absorbed dose is 0.10 Gy. More preferably, the average concentration of alkali metal in a core is 10 atomic ppm (8 weight ppm or less when converted into a concentration of $K_2O$ by weight); in such case, the attenuation increase becomes 0.015 dB/km or less.

The effect of chlorine element contained in an optical fiber will be explained in the following. According to prior art literature, it is advised that the coexistence of alkali metal element and chlorine element in silica glass should be avoided because of possible crystallization and an air bubble formation due to generation of alkali metal chloride. However, the inventor of the present application has found that the attenuation of an optical fiber decreases if chlorine of 300 atomic ppm or more are included in the core region, although formation of alkali metal chloride should be prevented in the optical fiber preform. That is, the inventor has found that it is advisable to make chlorine concentration higher in an optical fiber, while making the chlorine concentration lower in a preform for producing the optical fiber.

After preparing optical fibers which had potassium with an average concentration of 5 atomic ppm in the core region and which had a relative refractive index difference substantially formed with fluorine elements contained in the cladding region, the attenuation of these optical fibers at a wavelength of 1550 nm was investigated. The concentration of chlorine in the cores was set to various values.

The attenuation at the wavelength of 1550 nm was 0.157 dB/km in the case of an optical fiber having chlorine such that the minimum concentration was 3,000 atomic ppm in the core region and the average concentration was 7,000 atomic ppm in the whole core region. In the case of an optical fiber which had chlorine at a minimum concentration of 1,000 atomic ppm in the core region and at an average concentration of 2,200 atomic ppm in the whole core region, the attenuation at the wavelength of 1550 nm was 0.158 dB/km. In the case of an optical fiber which had chlorine with a minimum concentration of 300 atomic ppm in the core region and with an average concentration of 800 atomic ppm in the whole core region, the attenuation at the wavelength of 1550 nm was 0.158 dB/km. These optical fibers had a satisfactorily low attenuation. As a comparative example, the attenuation at the wavelength of 1550 nm was as high as 0.185 dB/km in the case of an optical fiber having chlorine with a minimum concentration of 200 atomic ppm in the core region and with an average concentration of 500 atomic ppm in the whole core region.

As for the other characteristics, the optical fibers were cut-off shifted type low-nonlinear fibers, and the cable cutoff wavelength was 1300 nm or more and 1530 nm or less when measured on a fiber having a length of 22 m. As to the characteristics at the wavelength of 1550 nm, the chromatic dispersion was +19.5 ps/nm/km or more and +21.5 ps/nm/km or less; the dispersion slope was +0.055 ps/nm$^2$/km or more and +0.065 ps/nm$^2$/km or less; the effective area was 125 µm$^2$ or more and 145 µm$^2$ or less; the mode field diameter was 12.2 µm or more and 13.0 µm or less; the polarization mode dispersion was 0.01 ps/√km or more and 0.10 ps/√km or less; and the nonlinear refractive index N2 was about 2.15×10$^{-20}$ m$^2$/W.

Thus, preferably an optical fiber has a core in which the average concentration of alkali metal is 25 atomic ppm or less, since the attenuation can be reduced if the minimum concentration of chlorine is 300 atomic ppm or more.

If the concentration of alkali metal in a core is too low, the attenuation will not decrease. However, there are cases where the attenuation decreases even if the concentration of alkali metal elements is too low to measure by the present SIMS method. Judging from the average concentration in an optical fiber preform, the attenuation will decrease if the concentration of alkali in a core is 0.2 atomic ppm or more.

Moreover, environmental reliability and durability of an optical fiber for properties such as hydrogen-resistance and strength will also be satisfactory if the optical fiber has such a concentration of alkali metal as mentioned above. For example, as for hydrogen-resistance, after a treatment performed under a hydrogen partial pressure of 1 atm (101 kPa) for 20 hours at a temperature of 80° C., the attenuation increase in the 1.38 µm wavelength band due to absorption of OH-group was 0.0 dB/km or more and 0.15 dB/km or less; 97% was 0.10 dB/km or less and 50% was 0.05 dB/km or less. All test pieces were satisfactory with no remarkable attenuation increase at a wavelength between 1530 nm and 1610 nm. In addition, there was no appearance of abnormal attenuation peak at a wavelength between 1420 and 1610 nm while a hydrogen treatment was conducted at a temperature of 40° C. under a hydrogen partial pressure of 0.1 atm for three months. As for strength, static fatigue coefficient (Ns) and dynamic fatigue coefficient (Nd), which are generally known as parameters to indicate a probability of fracture of an optical fiber, were both in a satisfactory range of 18 to 27.

In the following, an explanation will be given about a suitable optical fiber preform from which such an optical fiber as described above can be produced by drawing. In an optical fiber preform, crystals of SiO$_2$ (cristobalite) and air bubbles will easily be formed if an alkali metal salt is generated. Therefore, in order to produce an optical fiber which contains both alkali metal and chlorine elements in a core, it is desirable to design such that a first core portion containing a high concentration of alkali metal contains low concentration of chlorine. In order to increase the concentration of chlorine in the core portion as a whole, it is advisable to have the first core portion surrounded by a third core portion which contains substantially no alkali metal and which contains high concentration of chlorine elements. Also, it is advisable to prepare, between the first core portion and the third core portion, a second core portion with low concentration of alkali metal and chlorine so that the mutual diffusion of alkali metal elements and chlorine elements may be prevented and as a consequence, alkali metal salts may not be generated during the process of making an optical fiber preform.

That is, the core portion of an optical fiber preform has the first core portion, the second core portion, and the third core portion sequentially from the center thereof. In the first core portion, the concentration of alkali metal is high and the concentration of chlorine is low. The third core portion contains substantially no alkali metal elements but contains high concentration of chlorine. In the second core portion that exists between the first core portion and the third core portion, the alkali metal and the chlorine are both low concentration. To obtain a desired optical fiber, it is sufficient if such optical fiber preform is just drawn under suitable conditions.

Specifically, the average concentration of alkali metal in the core portion in an optical fiber preform is preferably 5 atomic ppm or more and 150 atomic ppm or less; in the first core portion, the minimum concentration of alkali metal is 10 atomic ppm or more, and the maximum concentration of chlorine is 600 atomic ppm or less; in the second core portion, the maximum concentration of alkali metal is 10 atomic ppm or less, and the maximum concentration of chlorine is 10 atomic ppm or more and 600 atomic ppm or less; and in the third core portion, preferably the maximum concentration of alkali metal is 10 atomic ppm or less and the average concentration of chlorine is 2,000 atomic ppm or more. The average concentration of chlorine may be 13,000 atomic ppm or less. Also, the peak concentration of alkali metal may be 500 atomic ppm or more and 5,000 atomic ppm or less in the first core portion.

More preferably, the maximum concentration of chlorine of both the first core portion and the second core portion is 10 atomic ppm or more and 200 atomic ppm or less. The first core portion and the second core portion may each contain fluorine at a maximum concentration in the range of 3,000 to 15,000 atomic ppm. In order to keep the refractive index of the core portion high, preferably the third core portion contains substantially no fluorine with the maximum concentration thereof being 200 atomic ppm or less.

Preferably, the core portion includes substantially no impurities. For example, it is desirable that the concentration of transition metal such as Fe, Ni, and Cu, is 10 ppb or less in the average of the entire core portion. Similarly, the concentration of OH group in the core portion is preferably 100 ppb or less. Preferably, the core portion does not include Ge, P, or the like, and the concentration of dopants other than alkali metal elements and halogen elements is smaller than the average concentration of halogen in the core portion. Preferably, the cladding portion is made of silica glass containing fluorine element and has a refractive index which is lower than the third core portion.

As to drawing manner, the following conditions may be advisable: the drawing speed (speed of processing into optical fiber) is 1,000 m/min or more and 3,000 m/min or less, for example; the drawing tension (tension applied to the glass part of an optical fiber) is set to 30 gf or more and 150 gf or less (0.3 N or more and 1.5 N or less); and the duration of stay in a state of glass fiber having a diameter of 200 μm or less in a high temperature drawing furnace is 0.01 second or more and 0.3 second or less. The outside diameter of an optical fiber preform may be 70 mm or more and 180 mm or less, and the outside diameter of glass part of an optical fiber may be 100 μm or more and 150 μm or less.

Figure 3:
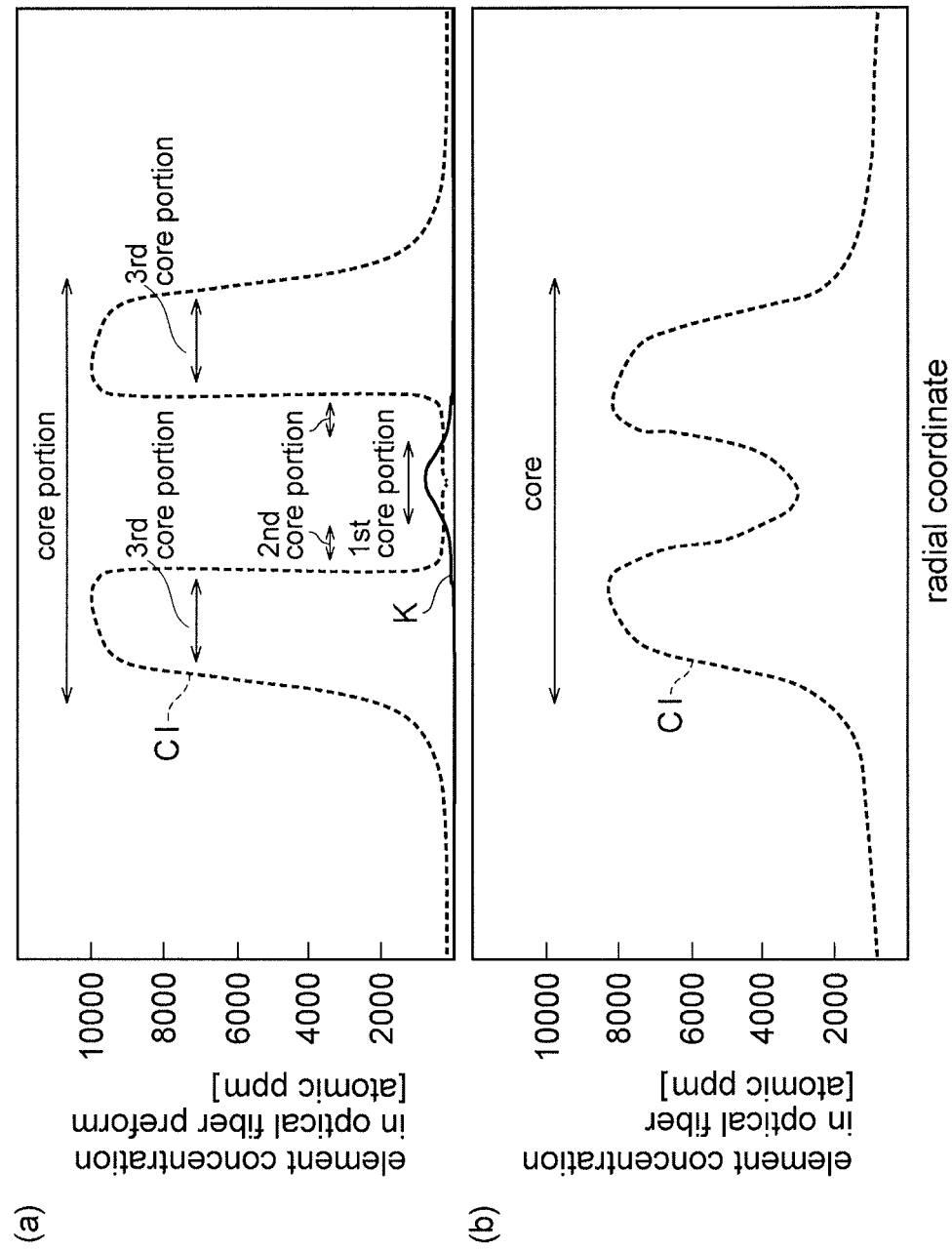
FIG. 3 Region (a) is a graph showing radial distribution of potassium concentration and chlorine concentration in the vicinity of the core portion in an optical fiber preform, and FIG. 3 Region (b) is a graph showing radial distribution of chlorine concentration in the vicinity of the core region of an optical fiber.

FIG. 3 Region (a) is a graph showing radial distribution of potassium concentration and chlorine concentration in the vicinity of the core portion in an optical fiber preform. FIG. 3 Region (b) is a graph showing radial distribution of chlorine concentration in the vicinity of the core region of an optical fiber which is made by drawing the optical fiber preform of FIG. 3 Region (a). In this case, a potassium element as an alkali metal element was added to the core portion of the optical fiber preform so that the maximum concentration might become about 800 atomic ppm and the average concentration in the core portion might be about 10 atomic ppm. The conditions for drawing the optical fiber preform into a fiber were set as follows: the drawing speed was 1,300 mm/min; the drawing tension was 70 gf; and the duration of stay in the drawing furnace in the state of a glass fiber having a diameter of 200 μm or less was about 0.05 second.

Figure 4:
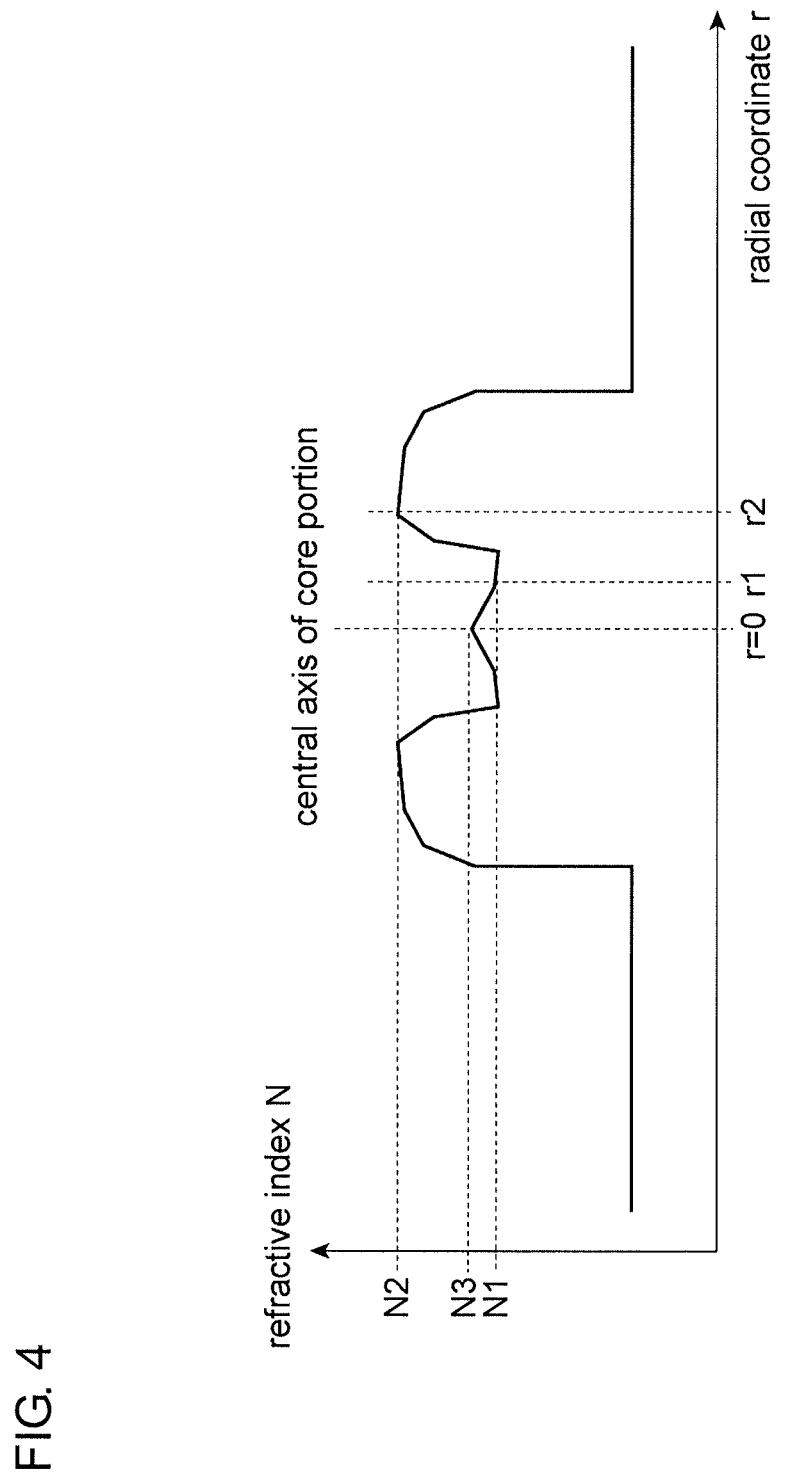
FIG. 4 is a graph showing a refractive index profile of an optical fiber preform.

In an optical fiber preform having such radial distributions of concentration of chlorine and fluorine, the refractive index is low near the central axis of the core portion and becomes higher around the periphery thereof. That is, the core portion has a minimum refractive index N1 at a radial coordinate r1 which is smaller than a radial coordinate r2 which has a maximum refractive index N2 in the core portion. At the time of diffusion doping of an alkali metal element, the alkali metal reacts with fluorine, whereby alkali fluoride salt is generated. There are cases where alkali fluoride salt is desorbed from the inner surface of glass tube, which increases the refractive index in the inner surface of the glass tube. In a glass rod which is obtained by consolidating the glass pipe and which contains the alkali metal element, the refractive index in the vicinity of the central part is higher than the minimum value. That is, the optical fiber preform may satisfy N1<N3<N2, where N3 is a refractive index at the central axis (r=0) of the core portion (FIG. 4).

A refractive index profile in the radial direction of an optical fiber will be deformed from the refractive index profile of an optical fiber preform by the stress distribution remaining in the optical fiber and the diffusion of chlorine and fluorine elements in a heating process such as a drawing process. However, the refractive index profile of the optical fiber has, as in the case of the optical fiber preform, the minimum refractive index N1 at the radial coordinate r1 which is smaller than the radial coordinate r2 having a maximum refractive index N2 in the core region. The core region may satisfy N1<N3<N2, where N3 is a refractive index at the central axis (r=0) of the core region.

In the following, the composition of an optical fiber preform as well as characteristics of a resultant optical fiber will be explained. Let D1 be a diameter of a first core portion of an optical fiber preform, D2 be a diameter of a second core portion, and D3 be a diameter of a third core portion, it is advisable that D3/D1 be in the range of 2 to 10, while D2/D1 be in the range of 1.1 to 6. The maximum relative refractive index difference of the third core portion relative to the minimum refractive index of the cladding portion is preferably in the range of 0.15 to 1.0%.

Figure 5:
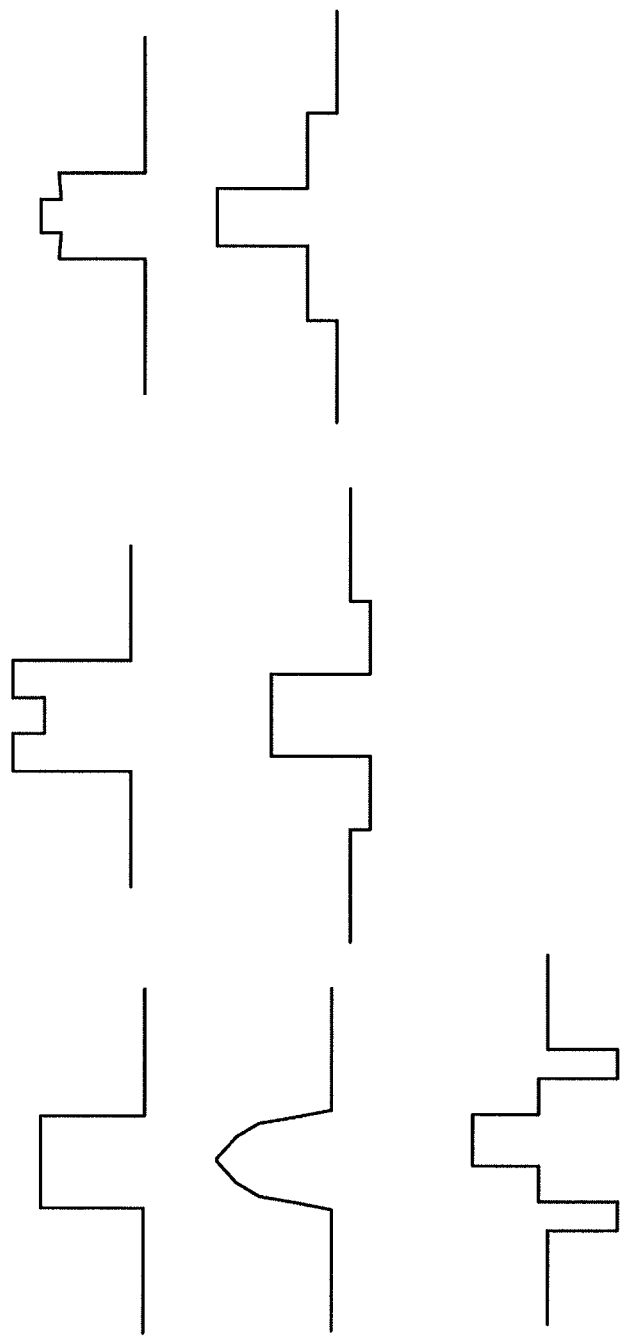
FIG. 5 shows conceptual diagrams of exemplary refractive index profiles of optical fiber preforms.
Figure 6:
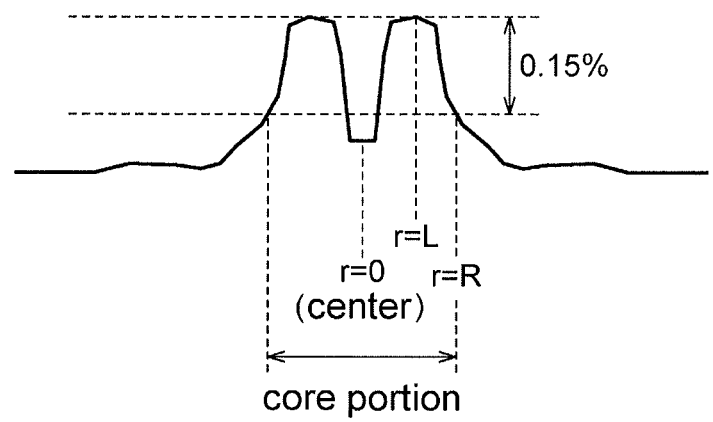
FIG. 6 is a conceptual diagram of refractive index profile of an optical fiber preform.

The optical fiber preform of the present invention may be an intermediate product of an optical fiber preform, and silica-based glass may be further provided around the periphery thereof. The core portion and the cladding portion of an optical fiber preform may have a structure of refractive index respectively, and the refractive index profiles may have various forms such as those shown in FIG. 5, for example, but not limited to them. In the refractive index profile of the optical fiber preform shown in FIG. 6, the refractive index at the position of radial coordinate r is expressed as N (r). At the radial coordinate L, the refractive index N (L) becomes a maximum Nmax. Here, an area in which a radial coordinate r is less than R is defined as a core portion, where |R|>|L| and (Nmax−N(R))/Nmax is 0.15%.

The attenuation of an optical fiber at the wavelength of 1550 nm is preferably 0.180 dB/km or less, more preferably 0.170 dB/km or less, and most preferably 0.160 dB/km or less. The effective cross-sectional area may be about 70 to 160 μm$^2$ at the wavelength of 1550 nm. The chromatic dispersion at the wavelength of 1550 nm may be +15 ps/nm/km or more and +22 ps/nm/km or less. The zero dispersion wavelength may be 1250 nm or more and 1350 nm or less. The dispersion slope may be +0.05 ps/nm$^2$/km or more and +0.07 ps/nm$^2$/km or less at the 1550 nm wavelength. The attenuation at a wavelength of 1380 nm is preferably 0.8 dB/km or less, more preferably 0.4 dB/km or less, and most preferably 0.3 dB/km or less.

The polarization mode dispersion in the 1550 nm wavelength band may be 0.2 ps/√km or less. The cable cutoff wavelength may be 1530 nm or less, and more preferably 1450 nm or less, which is a pump wavelength used for Raman amplification. Also, it may be 1260 nm or less as in the case of a standard single mode fiber. The diameter of the core region may be about 5 to 15 μm, and the maximum of relative refractive index difference between the core region and the cladding region, (refractive index of core region−refractive index of cladding region)/(refractive index of core region) may be in the range of 0.15% or more and 1.0% or less. The outside diameter of glass portion of an optical fiber may be about 110 μm to 150 μm, and the outside diameter of a resin coated optical fiber may be about 200 μm to 300 μm.

What is claimed is:

1. An optical fiber composed of silica based glass and having a core region and a cladding region surrounding the core region, the core region containing an alkali metal by an average concentration of 0.2 atomic ppm or more and 10 atomic ppm or less and chlorine by a minimum concentration of 300 atomic ppm or more such that an increase in attenuation of light travelling in the optical fiber at a wavelength of 1550 nm occurs after radiation exposure with a cumulative absorbed dose of 0.10 Gy is 0.02 dB/km or less as compared with the attenuation prior to the radiation exposure.

2. The optical fiber according to claim 1, wherein an average concentration of the chlorine is 13,000 atomic ppm or less.

3. The optical fiber according to claim 1, wherein the alkali metal in the core region is potassium.

4. The optical fiber according to claim 1, wherein
the average concentration of the chlorine is 2,000 atomic ppm or more.

5. The optical fiber according to claim 1, wherein
an attenuation of light travelling in the optical fiber at a wavelength of 1550 nm is 0.180 dB/km or less.

6. The optical fiber according to claim 1, wherein
the minimum concentration of the chlorine in the core region is 2,000 atomic ppm or more;
the average concentration of the chlorine in the core region is 4,000 atomic ppm or more and 13,000 atomic ppm or less;
a concentration of dopants, other than the alkali metal and the chlorine, in the core region is smaller than the average concentration of the chlorine in the core region; and
the attenuation at a wavelength of 1550 nm is 0.180 dB/km or less.

7. The optical fiber according to claim 1, wherein
the core region has a minimum refractive index N1 at a radial coordinate r1 smaller than a radial coordinate r2 having a maximum refractive index N2 in the core region.

8. The optical fiber according to claim 7, wherein
a refractive index N3 in a central axis of the core region satisfies N1<N3<N2.

9. The optical fiber according to claim 1, wherein
the minimum concentration of the chlorine in the core region is 1000 atomic ppm or less.

10. The optical fiber according to claim 1, further comprising a plastic coating having an outside diameter of 200 µm to 300 µm.

* * * * *